No. 778,663. Patented December 27, 1904.

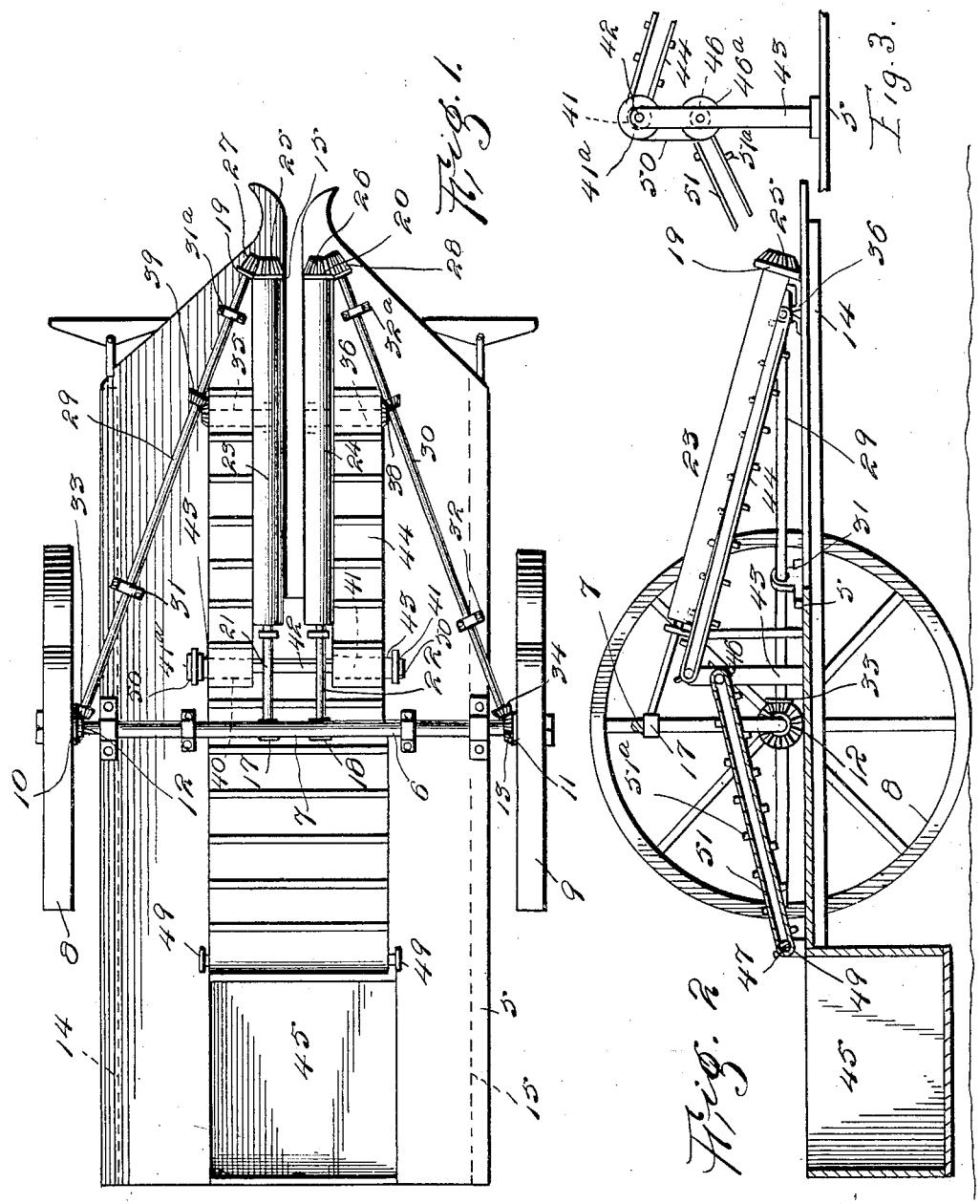

UNITED STATES PATENT OFFICE.

EZRA HOLLIS, OF OILFIELD, ILLINOIS.

CORN-GATHERER.

SPECIFICATION forming part of Letters Patent No. 778,663, dated December 27, 1904.

Application filed March 7, 1904. Serial No. 197,009.

*To all whom it may concern:*

Be it known that I, EZRA HOLLIS, a citizen of the United States, residing at Oilfield, in the county of Clark, State of Illinois, have invented certain new and useful Improvements in Corn-Gatherers; and I do hereby declare the following to be a full, clear, and exact description of the invention, such as will enable others skilled in the art to which it appertains to make and use the same.

This invention relates to corn-gatherers in general, and more particularly to that class wherein the corn is pulled from the stalk and delivered to aprons which convey it rearwardly to a box, the object of the invention being to provide a simple and efficient construction wherein the ears of corn will be removed from the stalks without injury to the corn and will be deposited quickly and without waste in the box.

In the drawings forming a portion of this specification, and in which like numerals of reference indicate similar parts in the several views, Figure 1 is a plan view of a gatherer constructed in accordance with the present invention. Fig. 2 is a central longitudinal section of the gatherer and showing the location of the conveying-aprons with respect to the gathering-rollers. Fig. 3 is a detail view showing the belt 50.

Referring now to the drawings, the present invention consists of a platform 5, having an arched axle 6 fixed to its upper face, with the arch 7 thereof extending upwardly and vertically, and upon the ends of the axle are mounted supporting-wheels 8 and 9, having extended hubs 10 and 11, which project inwardly from the ends of the axle in the direction of the platform and are provided at their inner ends with beveled gears 12 and 13, whereby as the platform is moved the supporting-wheels 8 and 9 thereof will act to rotate the bevel-gears.

Upon the under side of the platform are longitudinal sills 14, and with each of these sills at one end of the platform there is connected a swingletree or doubletree, as may be preferred, whereby horses may be hitched to the implement to draw it during its operation. The horse is hitched at one side of a central longitudinal slot 15, which leads rearwardly from the forward end of the platform and terminates in advance slightly of the arch 7 of the axle 6.

Bearings 17 and 18 are fixed upon the arch 7, and corresponding bearings 19 and 20 are fixed upon the platform, at the front end thereof, the bearings 17 and 19 lying at one side of the slot 15, while the bearings 18 and 20 lie at the opposite side of the slot, and in these bearings are journaled two shafts 21 and 22, carrying gathering-rollers 23 and 24, these rollers being disposed thus to slant rearwardly and upwardly. The shafts 21 and 22 are provided with bevel-gears 25 and 26, which engage bevel-gears 27 and 28, respectively, fixed upon shafts 29 and 30, which are journaled in bearings 31 and $31^a$ and 32 and $32^a$, respectively, upon the platform 5 and are provided with the bevel-gears 33 and 34 at their rear ends, these shafts 29 and 30 being disposed to diverge rearwardly, so as to engage the gears at the rear ends thereof with the gears 12 and 13 on the hubs of the wheels 10 and 11. Thus the gathering-rollers will be operated from the ground-wheels of the mechanism.

At the outer sides of the gathering-rollers and adjacent to their forward ends are rotatably mounted drums 35 and 36, each of which has a bevel-gear 38 at its outer end which meshes with a corresponding bevel-gear 39 on the adjacent shaft 29 or 30, whereby said drums may be driven from such shafts. Drums 40 and 41 are mounted on an axle 42 in uprights 43 upon the platform 5 adjacent to the rear ends of the gathering-rollers. With the drums at each end of the gathering-rollers are engaged endless belts or aprons 44, provided with transverse cleats, the arrangement of the several shafts and gears above referred to being such that when the gathering-rollers are moved with their adjacent faces upwardly the aprons will move with their upper portions rearwardly.

Below the level of the platform and carried thereby in the rear of the arch 7 is a box 45. A drum 46 is rotatably mounted in the uprights 43 below the drums 40 and 41, which may be carried by a single shaft, while a second drum 47 is journaled in bearings 49 at the front edge of the box, and the drum 46 is driven from drum 41 by means of a belt 50, which engages pulleys 41ª and 46ª on the shafts of said drums. The apron 51, which is disposed on drums 46 and 47, slants downwardly to the box and has transverse cleats 51ª, as shown.

The operation of the implement is as follows: The horse is driven to walk between the rows of corn, and the forward flared end of the stalk-receiving slot of the platform receives the stalks of a row of corn, said stalks passing into engagement with the gathering-rollers, which by their upward peripheral movement and their slanting arrangement move upwardly of the stalks and act to pinch the ears from the stalks, the ears pressing outwardly over the rollers and falling upon the aprons at the sides of the gathering-rollers, from which they are discharged rearwardly and onto the apron 51, which in turn discharges them to the box, where they are husked in any desired manner.

It will of course be understood that in practice I may vary the specific construction and arrangement shown and that any suitable materials and proportions may be employed for the various parts without departing from the spirit of the invention.

What is claimed is—

A corn-gatherer comprising a platform having a longitudinal slot, an axle fixed to the platform and having an arch disposed transversely thereof, gathering-rollers journaled at their forward ends upon the platform at opposite sides of the slot thereof and at their rear ends upon the arch of the axle, gears upon the forward ends of the rollers, ground-wheels upon the axle and having hubs provided with gears, diverging shafts connecting the gears upon the rollers with the gears upon the hubs, drums journaled adjacent to the forward ends of the rollers and having beveled gears, gears on the diverging shafts engaging the gears upon the drums, additional drums rotatably mounted on opposite sides of the rollers adjacent to their rear ends, an apron mounted on the drums at each side of the rollers, a roller journaled below the last-named drum in advance of the arch of the axle, a box, a drum journaled adjacent to the box, an apron mounted upon the drum at the arch and the last-named drum, and means for operating the last-named apron.

In testimony whereof I affix my signature in presence of two witnesses.

EZRA HOLLIS.

Witnesses:
  MONROE J. GLICK,
  ROBERT C. CATRON.